United States Patent Office 3,595,894
Patented July 27, 1971

3,595,894
ORGANOSILICON COMPOUNDS
Edwin Ian Gilbert Brown and James Jack, Stevenston, Scotland, and Edward Jervis Vickers, Manchester, England, assignors to Imperial Chemical Industries Limited, London, England
No Drawing. Filed Aug. 5, 1968, Ser. No. 750,022
Claims priority, application Great Britain, Aug. 7, 1967, 36,146/67
Int. Cl. C07f 7/02, 7/04
U.S. Cl. 260—448.2B                6 Claims

ABSTRACT OF THE DISCLOSURE

Silanes and siloxanes of the general formula $$R^2R^3R^4Si-R-[(OC_nH_{2n})_xOR'COOR'']_y$$

where R is a radical free from the olefinic unsaturation and of a valency 2 to 4 selected from the group consisting of hydrocarbon radicals having from 3 to 11 carbon atoms and radicals consisting of carbon, hydrogen and oxygen having from 7 to 17 carbon atoms, the oxygen being present in the form of ether linkages, R' is a divalent saturated hydrocarbon radical having not more than 4 carbon atoms, R'' is selected from the group consisting of lower alkyl radicals and polyoxyalkylene residues of the general formula $(C_bH_{2b}O)_zR'''$ where $b$ is 2, 3 or 4, $z$ is a positive integer and R''' is selected from the group consisting of lower alkyl groups and cycloalkyl groups, $n$ is 2, 3 or 4, X is 0 or a positive integer, $y+1$ is the valency of the radical R and $R^2$, $R^3$ and $R^4$ are selected from the group consisting of lower alkyl and lower alkylsiloxanyl groups. These compounds find utility as surfactants in the manufacture of polyurethane foams and as lubricants for textile fibres.

---

This invention relates to new and useful organosilicon compounds. A wide variety of organosilicon compounds are known and are readily available. These are suitable for many uses the optimum use in each case being largely dependent on the nature of the organic groups in the compounds and on the proportion thereof present.

According to the present invention a new and useful class of organosilicon compounds comprises those having at least one group of the general formula $$\diagdown\!\!\!\!\!\!\text{SiR}[(O\,C_nH_{2n})_xOR'COOR'']_y\diagup$$

where R is a radical free from olefinic unsaturation and of valency 2 to 4 selected from hydrocarbyl radicals having from 3 to 11 carbon atoms and radicals consisting of carbon, hydrogen and oxygen and having from 7 to 17 carbon atoms, the oxygen being present in the form of ether linkages, R' is a linear or branched divalent saturated hydrocarbyl radical having not more than 4 carbon atoms, R'' is a monovalent hydrocarbyl radical or a polyoxyalkylene residue, $n$ is 2, 3 or 4, $x$ is 0 or a positive integer and $y+1$ is the valency of the radical R.

The new compounds of our invention include silanes and siloxanes. Our invention also resides in the use of certain of the siloxanes (viz, those in which R'' is a polyoxyalkylene residue) in the manufacture of polyurethane foams and as lubricants for textile fibres.

The group R may be selected from, for example, di-, tri- and tetra-valent radicals, for example such as trimethylene, 2-methyl-1,3,-propylene, 1,3-butylene, 1,3-pentylene, 3-methyl-1,3-butylene, tetramethylene, 2-methyl-1,4-butylene, 1,4-pentylene, 2-methyl-1,4-pentylene, hexamethylene, undecamethylene,

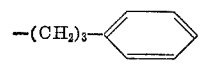

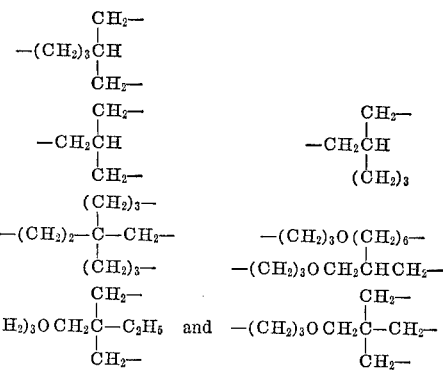

In many cases it is preferred that the group R be trimethylene.

The group R' may be any linear or branched saturated hydrocarbyl radical containing not more than 4 carbon atoms. Suitable groups include, for example, methylene, ethylene, 1,2-propylene and 1,3-butylene. Methylene and ethylene are, however, in many cases preferred.

The group R'' may be, as stated, a monovalent hydrocarbyl radical or a polyoxylalkylene residue and when a hydrocarbyl radical may be an alkyl, aryl, aralkyl, alkaryl or cyco-alkyl radical. Of the hydrocarbyn radicals alkyl radicals are, in general, preferred and lower alkyl radicals such as methyl, ethyl, propyl and butyl radicals are further preferred. When R'' is a polyoxyalkylene residue it is preferably of the general formula $(C_bH_{2b}O)_zR'''$ where $b$ is 2, 3 or 4 and preferably 2 or 3, $z$ is a positive integer and R''' is a monovalent hydrocarbyl radical free from olefinic unsaturation. While the value of $b$ may be 2, 3 or 4 it need not be restricted to one value in any residue. In fact it may well be considered desirable to have a mixture of, for example, oxyethylene and 1,2-oxypropylene groups since the properties of the products will be altered by the number and nature of the oxyalkylene groups. In general the incorporation of oxyethylene units renders the products more hydrophilic. R''' may be, for example, an alkyl radical such as a methyl, butyl or octyl radical, an aryl radical such as a phenyl radical, an alkaryl radical such as a tolyl radical, an aralkyl radical such as a benzyl radical or a cycloalkyl such as a cyclohexyl radical. In the compounds of our invention it is normally preferred that the group R'' be a polyoxyalkylene residue. The siloxanes of our invention having a polyoxyalkylene residue as group R'' have very useful surface active properties for example in the production of polyurethane foams and are useful as lubricants, particularly of textile fibres and especially synthetic fibres such as polyester, polyamide, polyolefin and acrylic fibres.

The remaining groups attached to the silicon atom or atoms having the group of the kind defined attached thereto in the compounds of our invention may be alkyl, aryl or organosiloxanyl groups. Suitable groups include, for example, methyl, ethyl, phenyl, polydimethylsiloxanyl and polymethylhydrogensiloxanyl groups. There may also be hydrolysable groups attached to silicon such as alkoxy or aroxy groups or halogen atoms for example, methoxy, ethoxy, isopropoxy, n-butoxy, 2-methoxy-ethoxy, 2-ethoxyethoxy, phenoxy and chlorine.

In one method of preparing the compounds of our invention an organosilicon compound which may be a silane or siloxane containing at least one silicon-bonded hydrogen atom is reacted with an unsaturated compound of the general formula

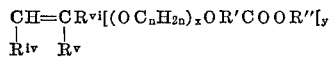

where $R'$, $R''$, $n$, $x$ and $y$ are as previously defined, $R^{iv}$ and $R^v$ are hydrogen or an alkyl group having not more than 4 and preferably 1 or 2 carbon atoms and $R^{vi}$ is a linear or branched radical such that the group

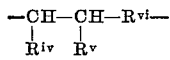

is the same as group R as previously defined. Suitable unsaturated reactants include, for example, $$CH_2\!=\!CHCH_2OCH_2COOC_2H_5$$

$$CH_2\!=\!CHCH_2OCH_2CH_2COOCH_3$$

$$CH_2\!=\!CHCH_2O(CH_2)_2COO(C_2H_4O)_{16}CH_3$$

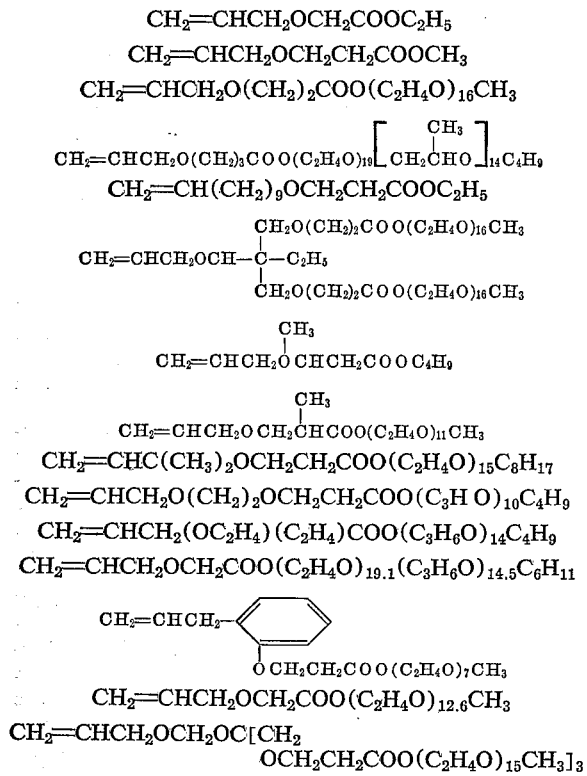

$$CH_2\!=\!CHC(CH_3)_2OCH_2CH_2COO(C_2H_4O)_{15}C_8H_{17}$$

$$CH_2\!=\!CHCH_2O(CH_2)_2OCH_2CH_2COO(C_3H\,O)_{10}C_4H_9$$

$$CH_2\!=\!CHCH_2(OC_2H_4)(C_2H_4)COO(C_3H_6O)_{14}C_4H_9$$

$$CH_2\!=\!CHCH_2OCH_2COO(C_2H_4O)_{19.1}(C_3H_6O)_{14.5}C_6H_{11}$$

$$CH_2\!=\!CHCH_2OCH_2COO(C_2H_4O)_{12.6}CH_3$$

$$CH_2\!=\!CHCH_2OCH_2OC[CH_2$$
$$OCH_2CH_2COO(C_2H_4O)_{15}CH_3]_3$$

Silanes which may be used in this method to produce the silanes of our invention include, for example, trichlorosilane, trimethoxysilane, triethoxysilane, tris(2-methoxyethoxy)silane, triacetoxysilane, methyldichlorosilane, methyldiethoxysilane, diacetoxymethylsilane, phenyldichlorosilane, dimethylchlorosilane and tris(1-methylethaniminoxy)silane. The reaction is normally carried out in presence of a catalyst of the kind known to catalyse the reaction between a compound containing the group $\equiv$SiH and one containing the group $$\diagdown_{\hspace{-0.5em}}C\!=\!C\diagup_{\hspace{-0.5em}}$$

These include platinum in a wide variety of forms such as platinum metal with or without a carrier, chloroplatinic acid and complexes of platinum halides with, for example, olefins, sulphides or phosphines. The reaction may, if desired, be carried out in presence of a solvent.

In another method of preparing the polysiloxanes of our invention the corresponding nitrile or acid may be prepared and then converted by any of the known methods to the desired alkyl or polyether ester.

The siloxanes of our invention may also be prepared by the hydrolysis, either alone or in the presence of one or more other hydrolysable silanes, of a silane of our invention.

The siloxanes of our invention may be linear or branched and may contain triorganosiloxanyl, diorganosiloxanyl, mono-organosiloxanyl and $SiO_2$ units, the organo groups being hydrocarbyl or substituted hydrocarbyl groups such as alkyl, aryl, aralkyl, alkaryl, cycloalkyl, alkenyl or cycloalkenyl groups. Alternatively there may be a proportion of hydrogen atoms attached to silicon. Alkyl groups are in many cases preferred and methyl groups are particularly preferred.

Our invention is further illustrated by the following examples in which all parts and percentages are by weight.

EXAMPLE 1

1780 parts of a polyoxyalkylated cyclohexanol having the average formula $C_6H_{11}(OC_3H_6)_{14.5}(OC_2H_4)_{19.1}OH$ were dissolved in 870 parts of toluene, and the solution dried by azeotropic distillation with return of solvent to the mixture over a period of 45 minutes. The solution was cooled to 30° C. and treated with 109 parts of toluene para-sulphonic acid monohydrate and 139.2 parts of allyloxyacetic acid after which it was stirred and heated under gentle reflux conditions in a nitrogen atmosphere. Water evolved in the reaction was collected in a Dean and Stark separator. Water and toluene were run off from the separator over a period of 30 minutes during which time 650 parts of toluene were removed, and the temperateure of the refluxing reaction mixture increased to 145° C. Thereafter, water only was removed from the separator and after heating under reflux for 9 hours, during which time the temperature of the reaction mixture remained in the range of 145–150° C., 19 parts of water had been collected. The solution was cooled to 25° C., treated with 100 parts of anhydrous sodium carbonate and 130 parts of toluene and water removed by azeotropic distillation for 3½ hours. Solid salts were removed by filtration and the solution stripped of solvent by distillation at 100° C. at 0.2 mm. Hg pressure. There were thus obtained 1880 parts of clear light yellow oil having the average formula

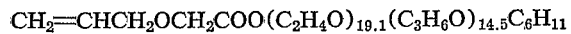
$$CH_2\!=\!CHCH_2OCH_2COO(C_2H_4O)_{19.1}(C_3H_6O)_{14.5}C_6H_{11}$$

The hydroxyl value of this product was less than 0.01 mg. KOH/g.

1050 parts of the so prepared esterified polyether were dissolved in 1560 parts of toluene and the solution dried by azeotropic distillation with return of solvent to the mixture over a period of 45 minutes. The solution was cooled to 25° C. and 382 parts of a linear polysiloxane having the average formula

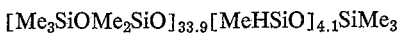
$$[Me_3SiOMe_2SiO]_{33.9}[MeHSiO]_{4.1}SiMe_3$$

added thereto, followed by a solution of 0.121 part of bis(diethylsulphide)platinous chloride in 26 parts of toluene. The mixture was stirred under an atmosphere of nitrogen and the temperature of the reactants raised to 81° C. over a period of 15 minutes and maintained in the range 81–89° C. for a period of 5½ hours. The solution was then cooled to 25° C., filtered, and the solvent removed by distillation at 100° C. and 2 mm. Hg pressure. There were thus obtained 1420 parts of a clear brown oil of viscosity 110 cs. at 25° C. No silicon-bonded hydrogen could be detected in the product by infra-red spectroscopy.

A resilient polyurethane foam of fine, even texture and density 1.7 lb./cu. ft. was obtained by mixing together 100 parts of oxypropylated glycol of molecular weight 3,000, 51 parts of an 80:20 mixture of the 2,4- and 2,6-isomers of tolylene di-isocyanate, 4 parts of water, 0.075 part of triethylene diamine, 0.3 part of stannous octoate and 1 part of the polysiloxane polyoxyalkylene copolymer prepared as described above.

EXAMPLE 2

1000 parts of esterified polyether prepared as described in Example 1 were dissolved in 1600 parts of toluene and the solution dried by azeotropic distillation with return of solvent to the mixture over a period of 45 minutes. The solution was cooled to 25° C. and 333 parts of a linear polysiloxane having the average formula $$Me_3SiO[Me_2SiO]_{76}[MeHSiO]_7SiMe_3$$

added thereto, followed by a solution of 0.121 part of bis(diethylsulphide)-platinous chloride in 25 parts of toluene. The mix was stirred under an atmosphere of nitrogen and its temperature raised to 93° C. over a period of 30 minutes. A further 0.121 part of bis(diethylsulphide)platinous chloride dissolved in 25 parts of toluene was then added to the mixture and the temperature maintained in the range 93–97° C. for 6 hours. The solution was cooled to 25° C., filtered, and the solvent removed by distillation at 100° C. and 2 mm. Hg. pressure. There were thus obtained 1320 parts of a clear light brown oil of viscosity 5030 cs. at 25° C. No silicon-bonded hydrogen could be detected in the product by infra-red spectroscopy.

A resilient polyurethane form of fine, even texture and density 1.7 lb./cu. ft. was obtained when 1 part of the polysiloxane/polyoxyalkylene copolymer prepared as described above was used in place of the copolymer of Example 1 in the process of Example 1.

EXAMPLE 3

349 parts of a polyoxyalkylated methanol having the average formula $CH_3(OC_2H_4)_{12.6}OH$ were dissolved in 36 parts of toluene and the solution dried by azeotropic distillation with return of solvent to the mixture over a period of 45 minutes. The solution was thereafter cooled to 35° C. and 1.1 parts of toluene parasulphonic acid monohydrate and 65.7 parts of allyloxyacetic acid added thereto. The solution was stirred and heated under reflux. Water evolved in the reaction was collected in a Dean and Stark separator. Water and toluene were run off from the separator over a period of 5 minutes during which time 20 parts of toluene were removed and the reflux temperature of the reaction mixture increased to 200° C. Thereafter, water only was removed from the separator and after heating under reflux for 6.5 hours, 10.5 parts of water had been collected. The mixture was cooled to 25° C. and freed from acid by passing it through a bed of chromatographic grade alumina using toluene as eluent. The solution was then stripped of solvent at 110° C. at 15 mm. Hg pressure whereby there were obtained 402 parts of a clear yellow oil of refractive index at 25° C. of 1.4612 and having the average formula $CH_2=CH.CH_2OCH_2COO(C_2H_4O)_{12.6}CH_3$.

A mixture of 110.6 parts of the so prepared esterified polyether, 38.6 parts of a linear polysiloxane having the formula $Me_3SiO[Me_2SiO]_{35.5}[MeHSiO]_{12.5}SiMe_3$, and 140 parts of toluene was dried by azeotropic distillation with return of solvent to the mixture. The mixture was thereafter cooled to 90° C. and a solution of 0.0315 part of bis(diethylsulphide)platinous chloride in 6.2 parts of toluene added thereto, after which it was stripped of solvent at 110° C. at 15 mm. Hg pressure. The mixture was heated under reflux for 3 hours. There were thus obtained 149 parts of a clear brown oil, having a viscosity of 1094 cs. at 25° C.

100 parts of an oxypropylated trimethylolpropane of average molecular weight 315, 145 parts of crude 4,4'-di-isocyanatodiphenylmethane, 25 parts of trichlorofluoromethane, 0.2 part of dibutyltin dilaurate, 15 parts of tri-beta-chloroethyl phosphate, 1 part of N,N-dimethylcyclohexylamine and 1 part of the polysiloxanepolyoxyalkylene copolymer prepared as described above were mixed together. There was thus obtained a rigid polyurethane foam of fine, even texture and density 2.8 lb./cu. ft.

EXAMPLE 4

A mixture of 15 parts of a linear polysiloxane of average formula $$Me_3Si[OSiMe_2]_{15}[OSiHMe]_3OSiMe_3$$

5 parts of ethyl 3-allyloxypropionate, 125 parts of dry toluene and 0.05 part of a cyclohexene-platinous chloride complex catalyst were heated under reflux for 2 hours and the resulting reaction mixture filtered. The toluene was removed by distillation to give 15.5 parts of a colourless liquid possessing a refractive index at 25° C. of 1.4190. This product was of the average formula

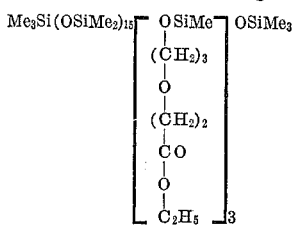

Its infrared spectrum indicated the presence of a carbonyl group at $\gamma=5.76\mu$ and absence of SiH.

EXAMPLE 5

A mixture of 28 parts of allyloxypropionic acid, 175 parts of a polyether of the average formula $$HO(CH_2CH_2O)_{16}CH_3$$

150 parts of dry toluene and 0.04 part of toluene p-sulphonic acid monohydrate was heated under reflux for 12 hours in an apparatus fitted with a Dean and Stark separator for the removal of water formed in the reaction. Acidic products were removed by stirring the reaction mixture with 10 parts of sodium bicarbonate and a further 100 parts of toluene. After filtration the toluene was removed by distillation under vacuum. There were thus obtained 158 parts of a waxy product of M.P. 30–33° C. which was identified by infra-red spectroscopy as the polyether ester of average formula $$CH_2=CHCH_2OCH_2CH_2COO(CH_2CH_2O)_{16}CH_3$$

A mixture of 100 parts of the so prepared polyether ester, 140 parts of a linear polysiloxane of the average formula $$Me_3Si(OSiMe_2)_{45}(OSiHMe)_3OSiMe_3$$

0.1 part of a cyclohexane-platinous chloride complex and 200 parts of dry toluene were heated at 150° C. for 12 hours. Removal of the toluene under reduced pressure gave 212 parts of a waxy solid copolymer of M.P. 30–34° C. which had the average formula

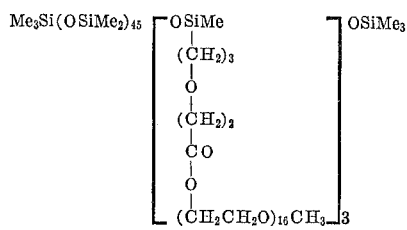

1 part of the so prepared copolymer was mixed with 100 parts of an oxypropylated sorbitol of average molecular weight 690, 187 parts of 4,4'-diisocyanate-diphenyl methane, 68 parts of trichlorofluoromethane, 10 parts of glycerol and 4 parts of a 33.3 percent solution of triethylene diamine in dipropylene glycol. There was thus obtained a rigid polyurethane foam of fine, even texture and of density 2.8 lb. per cu. ft.

A mixture of 10 parts of the so prepared copolymer and 90 parts of water was shaken at 20° C. to give a milky solution. This solution was applied to a polyethyleneglycol terephthalate yarn by means of a lick roller and resulted in a pick up of 1 percent of the copolymer in the yarn. The coefficient of friction of the so treated yarn against various surfaces and at various temperatures was measured using a Shirley Friction Tester. The results are shown in the following tables:

|  | Yarn speed | | | | | | | |
|---|---|---|---|---|---|---|---|---|
|  | 100 ft./min. | | | | 1,000 ft./min. | | | |
|  | Surface | | | | | | | |
|  | Rough chrome | Smooth chrome | Rough ceramic | Smooth ceramic | Rough chrome | Smooth chrome | Rough ceramic | Smooth ceramic |
| Coefficient of friction at 25 C°.. | 0.18 | 0.43 | 0.31 | 0.215 | 0.23 | 0.52 | 0.29 | 0.25 |

|  | Yarn speed—100 ft./min. | | | | | | |
|---|---|---|---|---|---|---|---|
| Temp., ° C | 50 | 75 | 100 | 125 | 150 | 175 | 200 |
| Coefficient of friction against smooth chrome | 0.54 | 0.57 | 0.55 | 0.54 | 0.52 | 0.50 | 0.50 |

The electrical resistance of the treated yarn was $0.11 \times 10^5$ megohms.

EXAMPLE 6

A polyether ester of allyloxypropionic acid was prepared by esterification of allyloxypropionic acid with a random copolymer of the average formula $$HO(C_2H_4O)_{19.1}(C_3H_6O)_{14.5}C_6H_{11}$$

by the method described in Example 5. The resulting product was a pale yellow coloured fluid of $n_D^{25}$ 1.4602.

A mixture of 230 parts of the so prepared polyether ester, 66 parts of a linear polysiloxane of the average formula $Me_3Si[OSiMe_2]_{15}[OSiMeH]_3OSiMe_3$, 0.1 part of cyclohexene platinous chloride complex and 200 parts of dry toluene was heated at 150° C. for four hours. Removal of the toluene under reduced pressure gave 296 parts of a fluid $n_D^{25}$ 1.4505 which had the average general formula

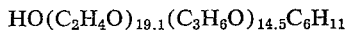

where R is

—$(CH_2)_3O(CH_2)_2COO(C_2H_4O)_{19.1}(C_3H_6O)_{14.5}C_6H_{11}$

A resilient polyurethane foam of fine, even texture and density 1.7 lb./cu.ft. was obtained by mixing together 100 parts of oxypropylated glycerol of average molecular weight 3,000 51 parts of an 80:20 mixture of the 2,4- and 2,6-isomers of tolylene di-isocyanate, 4 parts of water, 0.075 part of triethylene diamine, 0.3 part of stannous octoate, and 1 part of the so prepared polysiloxane polyoxyalkylene copolymer.

EXAMPLE 7

A mixture of 30 parts of the polyether ester of allyloxypropionic acid described in Example 6. 9.78 parts of a linear random polysiloxane of the average general formula $$Me_3Si(OSiMe_2)_{33.9}(OSiMeH)_{4.1}OSiMe_3$$

44 parts of dry toluene and 0.003 part of bis(diethylsulphide) platinous chloride was stirred and heated at 80–90° C. for five hours in an atmosphere of dry nitrogen and the toluene removed by distillation under reduced pressure. There were thus obtained 39 parts of a clear yellow brown viscous oil of the average formula

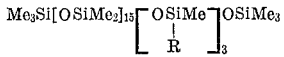

When 1 part of the above product was used as the polysiloxane polyoxyalkylene copolymer component in the where R is

—$(CH_2)_3O(CH_2)_2COO(C_2H_4)_{19.1}(C_3H_6O)_{14.5}C_6H_{11}$ polyurethane foam formulation described in Example 6 there resulted a fine, even textured resilient foam of density 1.6 lb./cu.ft.

EXAMPLE 8

A polyether ester of the average general formula

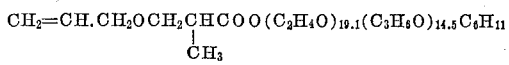

was prepared by esterification of 1-methyl-2-allyloxypropionic acid with a random polyether copolyether of average general formula $$HO(C_2H_4O)_{19.1}(C_3H_6O)_{14.5}C_6H_{11}$$

according to the method described in Example 2.

A mixture of 31 parts of the so prepared polyether ester 13.2 parts of a polysiloxane of average formula $$Me_3Si(OSiMe_2)_{76}(OSiMeH)_7OSiMe_3$$

0.035 part of bis(diethylsulphide)platinous chloride and 100 parts of dry toluene was heated at 90–100° C. for 7 hours. Removal of the toluene under reduced pressure gave 44 parts of a yellow coloured fluid of $n_D^{25}$ 1.4421 which had the average general formula

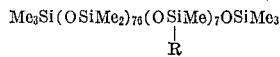

where

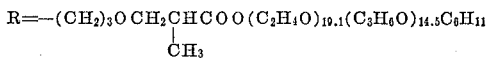

A resilient polyurethane foam of fine even texture and density 1.7 lb./cu. ft. was obtained by mixing together 100 parts of oxypropylated glycerol of average molecular weight 3,000, 51 parts of an 80:20 mixture of the 2,4- and 2,6-isomers of tolylene di-isocyanate, 4 parts of water, 0.075 part of triethylene diamine, 0.3 part of stannous octoate and 0.9 part of the so prepared polysiloxane polyoxyalkylene copolymer.

EXAMPLE 9

A mixture of 295 parts of the unsaturated dimethyl ester

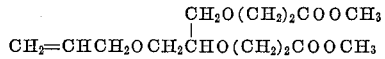

680 parts of a linear polysiloxane of the average general formula $$Me_3SiO(MeHSiO)_{4.2}(Me_2SiO)_{33.8}SiMe_3$$

and 0.23 part of bis(diethylsulphide)platinous chloride in 650 parts of toluene were stirred and heated under reflux for 2 hours in an atmosphere of nitrogen. Toluene was then removed by distillation until the pot temperature reached 160° C. after which the reaction mixture was maintained there for a further 1½ hours. All material volatile up to a temperature of 160° C. at 0.05 mm. Hg pressure was removed by distillation. There were thus obtained 918 parts of a clear light yellow liquid having the average general formula

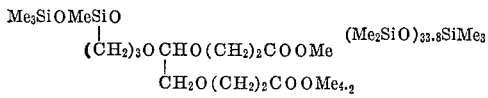

and of viscosity 2703 cs. at 25° C.

EXAMPLE 10

A mixture of 17 parts of a linear polysiloxane of average formula $Me_3SiO(MeSiO)_{34}(MeHSiO)_4SiMe_3$, 20 parts of toluene and a solution of 0.006 part of bis(diethylsulphide) platinous chloride in 5 parts of toluene was stirred under an atmosphere of nitrogen and heated to 90° C. A solution of 11 parts of

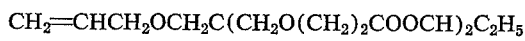

in 30 parts of toluene was added thereto and the mixture heated for 12 hours at 115° C.

The solution was stripped of toluene and unreacted ester by distillation at 190° C. and 0.2 mm. Hg pressure. There were thus obtained 16 parts of a clear light brown oil of the average formula

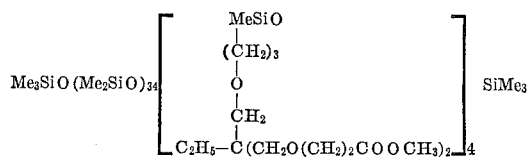

Its IR spectrum indicated the presence of a carbonyl group at 571μ.

What we claim is:
1. Silanes and siloxanes of the general formula

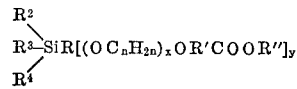

where R is a radical free from olefinic unsaturation and of valency 2 to 4 selected from the group consisting of hydrocarbon radicals having from 3 to 11 carbon atoms and radicals consisting of carbon, hydrogen and oxygen having from 7 to 17 carbon atoms, the oxygen being present in the form of ether linkages, R' is a divalent saturated hydrocarbon radical having not more than 4 carbon atoms, R" is selected from the group consisting of lower alkyl radicals and polyoxyalkylene residues of the general formula $(C_bH_{2b}O)_zR'''$ where $b$ is 2, 3 or 4, $z$ is a positive integer and R''' is selected from the group consisting of lower alkyl groups and cycloalkyl groups, $n$ is 2, 3 or 4, $x$ is 0 or a positive integer, $y+1$ is the valency of the radical R and $R^2$, $R^3$ and $R^4$ are selected from the group consisting of lower alkyl and lower alkylsiloxanyl groups.

2. Silanes and siloxanes according to claim 1 wherein the group R is a triethylene group.

3. Silanes and siloxanes according to claim 1 wherein the group R' is selected from the group consisting of methylene, ethylene, 1,2 - propylene and 1,3 - butylene groups.

4. Silanes and siloxanes according to claim 1 wherein the group R" is selected from the group consisting of methyl, ethyl, propyl, and butyl groups.

5. Silanes and siloxanes according to claim 1 wherein the group R''' is selected from the group consisting of methyl, butyl, octyl, and cyclohexyl groups.

6. Silanes and siloxanes according to claim 1 wherein the groups $R^2$, $R^3$ and $R^4$ are selected from the group consisting of methyl, ethyl, polydimtehylsiloxanyl and polymethylhydrogensiloxanyl groups.

References Cited
UNITED STATES PATENTS

| | | | |
|---|---|---|---|
| 3,033,815 | 5/1962 | Pike et al. | 260—448.2X |
| 3,240,754 | 3/1966 | Pleuddeman | 260—448.2X |
| 3,355,473 | 11/1967 | Clark et al. | 260—448.2 |
| 3,402,191 | 9/1968 | Morehouse | 260—448.2 |
| 3,478,076 | 11/1969 | Kim et al. | 260—448.2 |

JAMES E. POER, Primary Examiner

W. F. W. BELLAMY, Assistant Examiner

U.S. Cl. X.R.

260—448.8R